United States Patent [19]

Hall

[11] Patent Number: 5,773,955
[45] Date of Patent: Jun. 30, 1998

[54] BATTERY CHARGER APPARATUS

[75] Inventor: William B. Hall, Annapolis, Md.

[73] Assignee: Northrop Grumman Corporation, Los Angeles, Calif.

[21] Appl. No.: 815,449

[22] Filed: Mar. 11, 1997

[51] Int. Cl.$^6$ .................................................. H01M 10/46
[52] U.S. Cl. ................................. 320/21; 320/39; 320/49
[58] Field of Search .................................. 320/20, 21, 22, 320/27, 28, 30, 31, 32, 39, 35, 48, 49, 50

[56] References Cited

U.S. PATENT DOCUMENTS

| | | | |
|---|---|---|---|
| 3,688,177 | 8/1972 | Reeves et al. ............................. | 320/24 |
| 5,182,508 | 1/1993 | Schauder . | |
| 5,307,000 | 4/1994 | Podrazhansky et al. . | |
| 5,309,353 | 5/1994 | Schauder et al. . | |
| 5,371,456 | 12/1994 | Brainard .................................... | 320/31 |
| 5,510,725 | 4/1996 | Schantz, Jr. et al. . | |
| 5,517,063 | 5/1996 | Schantz, Jr. et al. . | |
| 5,602,462 | 2/1997 | Stich et al. ............................ | 320/48 X |

*Primary Examiner*—Edward Tso
*Attorney, Agent, or Firm*—Walter G. Sutcliff

[57] ABSTRACT

A battery charger which supplies charging current for a high voltage, high current battery in accordance with a charge profile which preferably includes both a charge pulse sequence as well as a discharge pulse sequence. Charging power is obtained from a three phase power line the voltage of which is reduced by an isolation transformer. Conversion of ac to dc is accomplished by a switching transistor power converter having a control for supplying transistor switching signals. The control is responsive to the angle of line voltage, the actual line current and a reference signal indicative of desired charge current, to generate the transistor switching signals. Any deviation between actual and desired current is then corrected by modification of the transistor switching signals.

12 Claims, 6 Drawing Sheets

BATTERY CHARGER APPARATUS

BACKGROUND OF THE INVENTION

1. Field of the Invention

The invention in general relates to battery chargers and more particularly to a high power, pulsed current battery charger system particularly well adapted for the rapid charging of electric vehicle batteries.

2. Description of Related Art

After a predetermined use, a secondary battery may be recharged by supplying a charging current until full battery charge is restored. In one typical system, charging current is supplied by a source of ac power connected to a rectifier which then provides dc current to the battery for a certain time period depending upon the battery state of charge.

In an improved battery charging technique, the charge profile consists of one or more positive charge pulses of relatively long duration, followed by one or more negative discharge pulses of relatively shorter duration. This alternate charge-discharge pulse technique enhances battery charge acceptance, reduces internal heating, reduces the time necessary for battery charging and prolongs battery life.

In some battery systems, such as utilized in electric vehicles, a string of batteries provides operating potential of hundreds of volts at a current rating of hundreds of amperes. These high power battery systems are typically charged from a high voltage multiphase power line. It would be desirable to charge these high power batteries utilizing the alternate charge-discharge pulse technique. The problem however is in devising a relatively low cost system which will provide satisfactory pulse characteristics while maintaining the quality of the ac input power in terms of power factor and harmonic distortion of the ac current. The present invention provides a solution to the problem.

SUMMARY OF THE INVENTION

Apparatus for charging a battery from a multiphase power source in accordance with the present invention includes an isolation transformer having a plurality of primary windings connected to the multiphase power source, and a plurality of secondary windings. A plurality of current conducting lines respectively connect the secondary windings to a converter preferably of the type which will convert ac to dc as well as dc to ac. A voltage boosting arrangement is positioned between the isolation transformer and the converter for driving current through the converter. The apparatus also includes a converter control means for governing operation of the converter.

A synch signal generator is operable to provide a synch signal indicative of the angle of the voltage of the power source and this signal is provided to the converter control. In addition, current sensors provide the converter control with an indication of the current within the current conducting lines. A third input to the converter control consists of a reference signal indicative of a desired charge profile. This latter signal is derived from a battery charge control means which monitors certain battery parameters and provides a desired charge current profile to a processor which, in turn, generates the reference signal.

With the current indications, the synch signal and the reference signal as inputs, the converter control provides operating signals to the converter so as to control the current in the current conducting lines to be substantially in phase with the transformer secondary voltage and to provide a charging current in accordance with the charge profile.

DESCRIPTION OF THE PREFERRED EMBODIMENT

Figure 1:
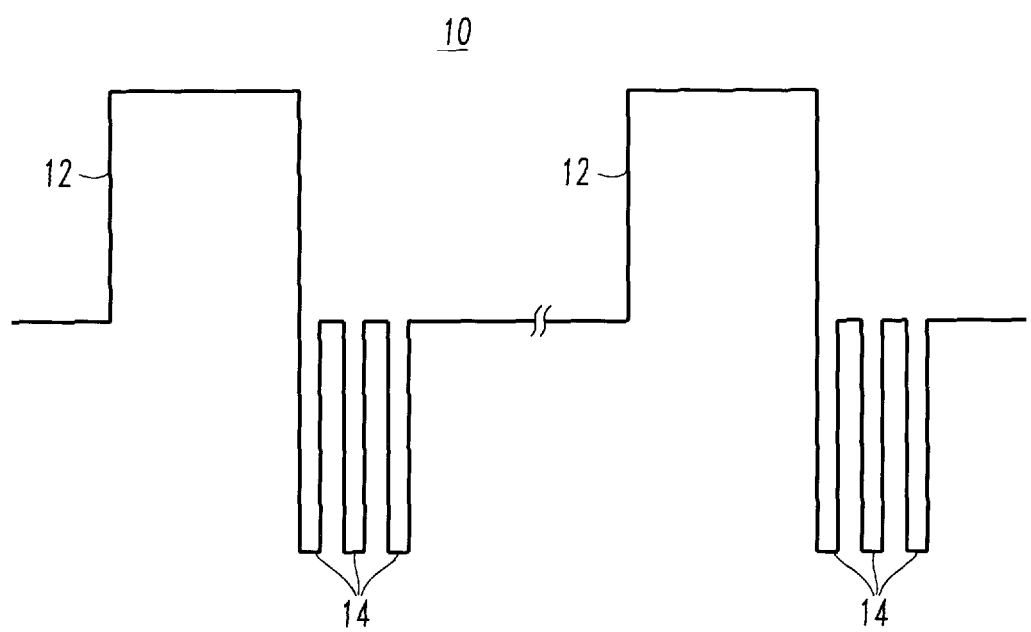
FIG. 1 illustrates a battery charge profile which includes both a charge and a discharge portion.

Referring now to FIG. 1, there is illustrated, in idealized form, a preferred battery charge profile 10. The profile consists of at least one positive charge pulse 12 of a relatively long duration, followed by one or more negative discharge pulses 14 of the same amplitude as the positive pulse but of a relatively short duration. By way of example, the duration of the positive pulse may be in the order of 800 ms and the negative pulses may be in the order of 10 ms.

As will be described, power is derived from a multiphase utility line to charge the battery during the charging cycle and power is returned back to the utility line during the discharge cycle. Although the charge profile 10 is preferred in order to optimize the charging, it will be apparent that the present invention may by utilized to charge a battery in accordance with other charge profiles such as a ramping or steady state profile.

Figure 2:
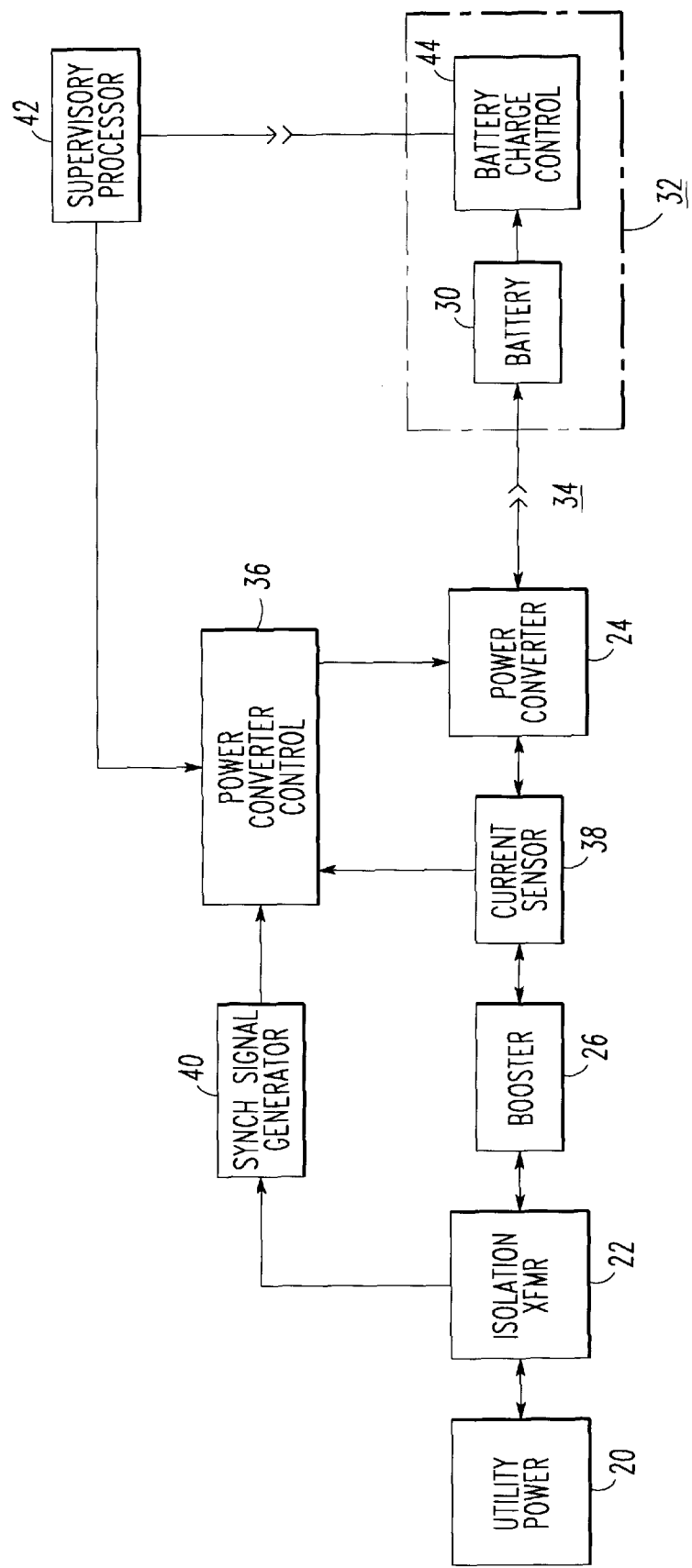
FIG. 2 is a block diagram of one embodiment of the present invention.

FIG. 2 is an example of an overall charging system in accordance with the present invention. Power for charging is obtained from a multiphase power source such as a utility line 20. An isolation transformer 22 reduces the line voltage and supplies charging current to a multiphase power converter 24 of the type that will convert ac to dc as well as dc to ac. A booster phase consisting of a voltage booster 26 may be incorporated in order to drive the charging current.

The power converter 24 is operable to supply unidirectional charging current to a battery 30 which, by way of example, may be for powering an electric vehicle 32 In such instance, the battery would actually be a string of batteries typically having an operating voltage of 300 volts or more, and capable of delivering several hundred amps, to drive a multiphase induction drive motor (not Shown). Therefore as used herein the term battery includes one or more batteries in an array. In accordance with the charge profile 10 of FIG. 1, the battery 30 also provides power back to the utility line during the discharge pulse portions.

The flow of power from the utility line 20 to the battery 30 and vice versa is controlled by the power converter 24 in a manner so as to maintain near unity power factor and low harmonic distortion. In order to accomplish this, operation of the power converter 24 is governed by a power converter control circuit 36.

Basically, the power converter control 36 is responsive to certain input signals in order to generate the proper control signals for operation of the power converter 24. More particularly, an indication of line current is supplied to the power converter control 36 by means of current sensor 38 and an indication of the instantaneous angle of the line voltage is provided by synch signal generator 40. A third signal, a desired current reference signal is supplied by a supervisory processor 42. This latter signal is derived from battery charge control circuit 44 which may, as illustrated be located on the vehicle 32, or may be incorporated as part of the supervisory processor. During a charging operation, not only is connector 34 engaged, but connector 46 is engaged as well.

Figure 3:
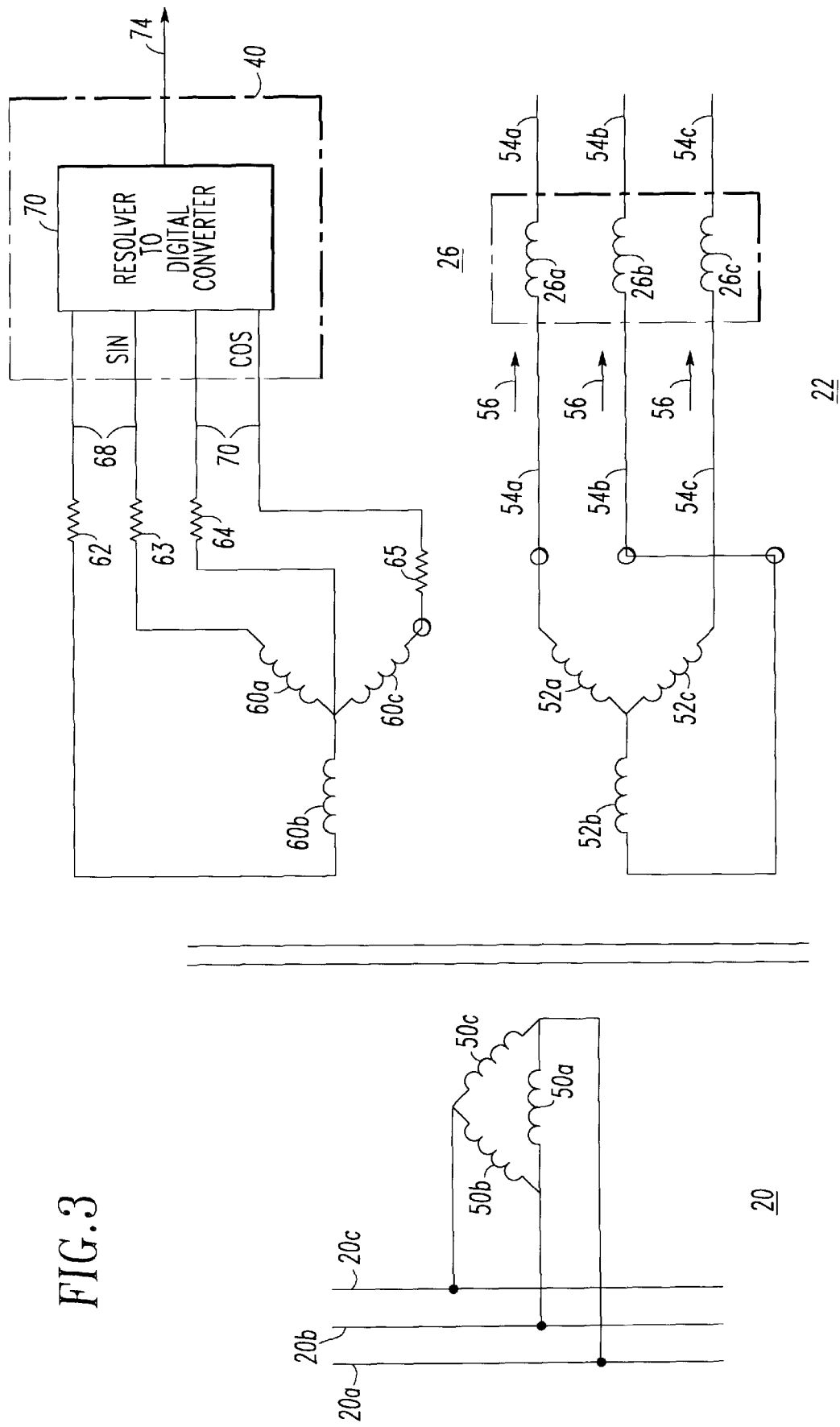
FIG. 3 illustrates the isolation transformer, synch signal generator and booster of FIG. 1 in more detail.

FIG. 3 illustrates several components of FIG. 2 in somewhat more detail. For example, for a three phase system the power line 20 consists of three phase lines 20a, 20b and 20c. The isolation transformer 22 has primary windings connected in delta and which includes windings 50a, 50b and 50c connected to the utility line 20. The secondary windings of the transformer 22 are connected in wye and consists of windings 52a, 52b and 52c for delivering charging current via current conducting lines 54a, 54b and 54c. During a battery charging operation current flow direction is assumed to be in the same direction as power flow as indicated by the arrows 56. During a battery discharge operation current flow would be in the reverse direction for putting power back into the mains.

Located in the current conducting lines 54a, 54b and 54c are respective boost inductors 26a, 26b and 26c constituting the voltage booster 26. These boost inductors provide voltage surges to drive the battery charging current during operation of the power converter 24. These inductors are of low inductance and could be eliminated if the leakage inductance of the isolation transformer 22 were sufficiently high.

The synch signal generator 40 is operable to provide an output signal indicative of the angular position of line voltage. This is accomplished with the provision of an additional secondary winding arrangement which includes windings 60a, 60b and 60c. The three phase voltage of these windings is converted to a two phase equivalent by means of scaling resistors 62 to 65 connected to the windings 60a, 60b and 60c, with scaling resistor 64 being connected to neutral in the wye arrangement. The resulting quadrature sine and cosine signals developed on lines 68 and 70 are provided to a resolver-to-digital converter 70 which then provides the desired synch signal at its output 74.

Figure 4:
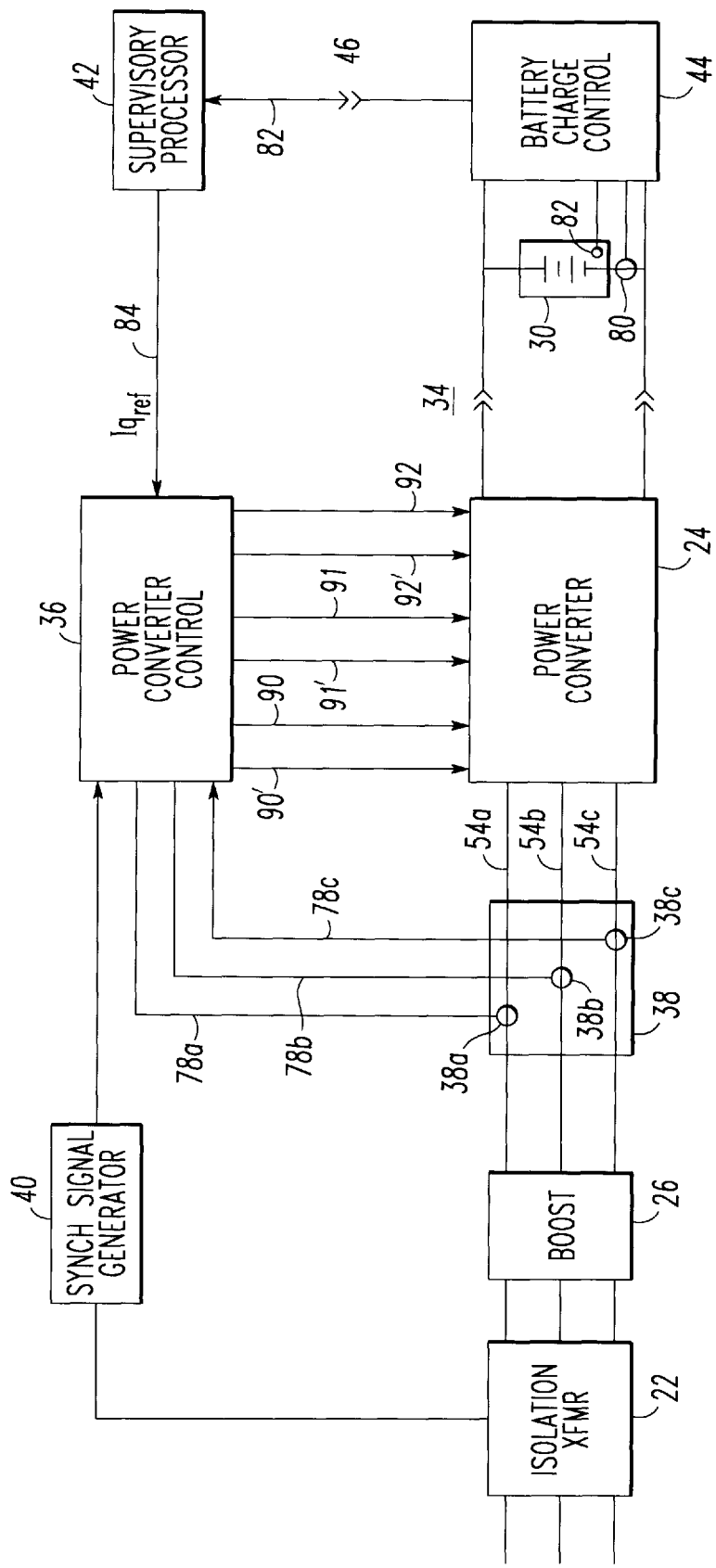
FIG. 4 is similar to FIG. 1 and shows several components in more detail.

FIG. 4 shows the current sensor 38 as including three sensor elements 38a, 38b and 38c each coupled to a respective current conducting line 54a, 54b and 54c, and each being operable to provide a signal indicative of the current in those lines. The current indicative signals are provided to power converter control 36 via signal conducting lines 78a, 78b and 78c. Although three current sensors are illustrated, in accordance with well known practice only two current sensors need be provided, for example 38a and 38c, since an indication of the third current may be derived from the other two readings.

The battery charge control circuit 44 in FIG. 4 is connected across the battery and is therefore provided with an indication of battery voltage. An indication of battery current is obtained by means of current sensor 80 and battery temperature is supplied by a temperature sensor such as a thermistor 82. In response to these predetermined battery parameters, the battery charge control circuit 44 is operable to generate a desired battery charge profile which it communicates to the supervisory processor 42 via a serial communication line 82.

The battery charge control circuit 44 communicates a desired number, width and amplitude of positive charge pulses, number, width and amplitude of negative discharge pulses and a time between pulses. To obtain the desired charge profile, the supervisory processor 42, in response to the received information from the battery charge control circuit 44, generates a reference signal $Iq_{ref}$ which is provided, on line 84, to the power converter control 36, which, as will be explained, operates the power converter 24 to supply the desired charging current to, and remove discharge current from, the battery 30.

The power converter control 36 receives three inputs, one a synch signal from the synch signal generator 40, a second from the current sensor 38 indicative of actual current being supplied and a third from supervisory processor 42 indicative of desired current. If the actual current deviates from the desired current, the power converter control 36 corrects the situation by control of the power converter 24 via control lines 90, 90', 91, 91' and 92, 92'.

Figure 5:
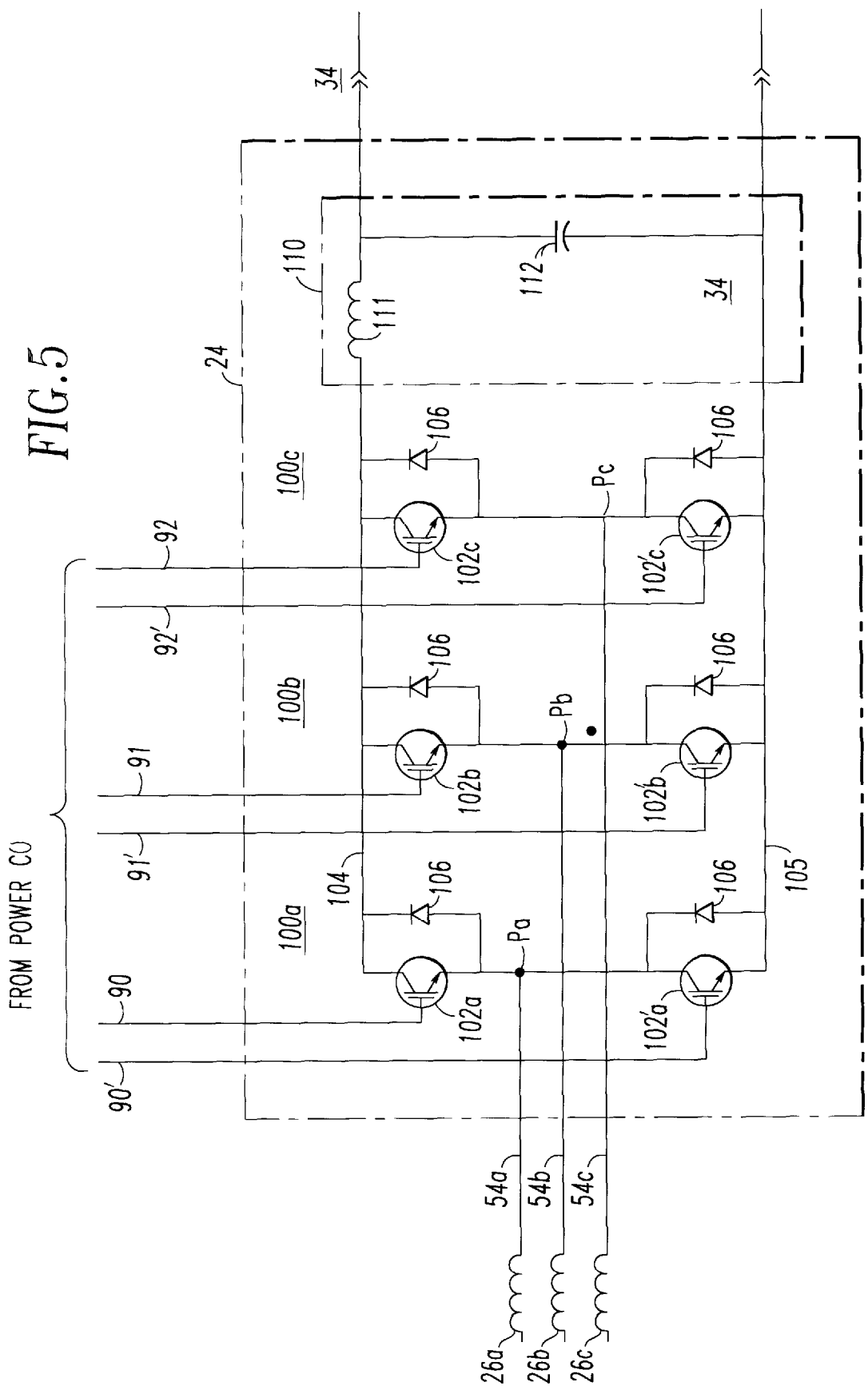
FIG. 5 is a block diagram illustrating one type of power converter which may be used herein.

FIG. 5 illustrates a preferred power converter 24 in more detail. The power converter 24 includes three switching circuits 100a, 100b and 100c each having a serially arranged pair of transistors constituted respectively by upper and lower transistors 102a and 102'a, 102b and 102'b and 102c and 102'c. Each upper transistor has a collector electrode connected to line 104, the positive battery line, and each lower transistor has an emitter electrode connected to line 105, the negative battery line. The emitter of each upper transistor is connected to the collector of its lower transistor, with the junction point between them constituting a pole designated Pa, Pb and Pc respectively.

A diode 106 is connected across the current path of each transistor and an output filter 110, including a filter inductor 111 and capacitor 112, is connected across lines 104 and 105 and serves to smooth the output current and reduce the effects of high speed switching of the transistors. Because of their high current density and relatively small size, as well as low switching and conduction losses, insulated gate bipolar transistors (IGBT) are preferred for use as the switching transistors.

The gate electrodes of the switching transistors are provided with control signals from the power converter control 36 over control lines 90,90' for transistors 102a and 102'a; over control lines 91,91' for transistors 102b and 102'b; and over control lines 92,92' for transistors 102c and 102'c. The switching circuits are controlled such that the upper and lower transistors are switched on and off at a switching speed of, for example, 8kHz, alternatively placing its respective pole Pa, Pb and Pc at a high voltage of line 104 and a low voltage of line 105 for varying periods of time, with the average waveform constituting a sinusoidal waveform. This sinusoidal waveform is in synchronism with the line voltage by operation of the converter control 36.

In a typical arrangement the transformer secondary voltage will be less than the nominal battery voltage. During the switching of the transistors a current path will be established through a boost inductor of one phase, through a lower transistor, and back through a lower diode and boost inductor of another phase. Current will ramp up in the inductor and when the lower transistor is turned off, the voltage on its pole side will increase to keep the current flowing. This voltage boost is sufficient to drive the current through an upper diode into the battery for charging. During a discharge, the transistors are operated such that current flows in the reverse direction putting power back into the isolation transformer. The process is repeated throughout the operation until full battery charge is established.

Figure 6:
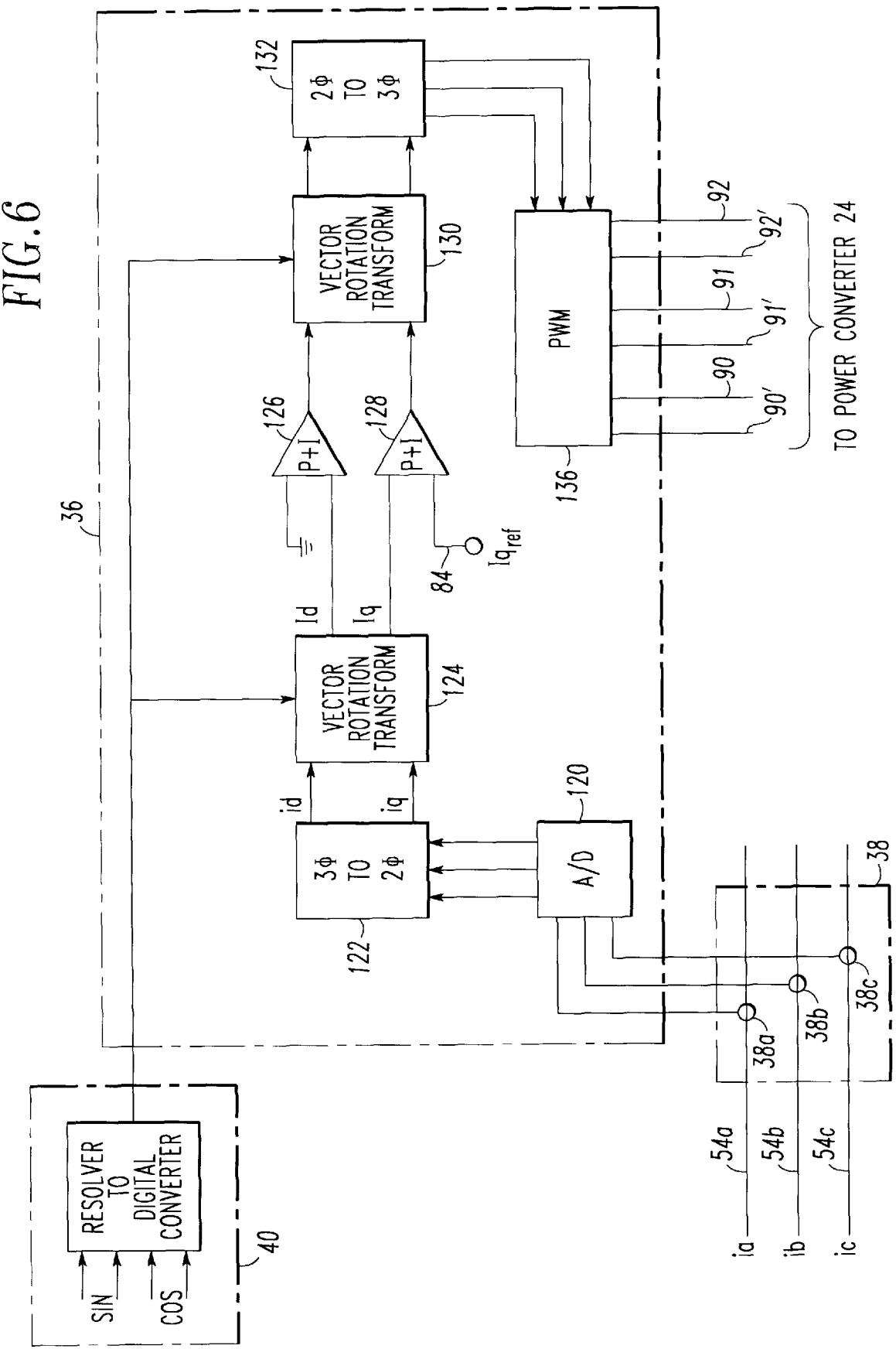
FIG. 6 is a block diagram of a converter control which may be used for controlling operation of the power converter.

One type of power converter control which may be utilized herein is illustrated in FIG. 6. The control process is carried out digitally and accordingly, an analog to digital converter 120 is provided for converting the current indicative signals from current sensor 38 to digital form. The three instantaneous phase currents may be represented by a single two dimensional vector derived by a three phase to two phase conversion 122, the output of which, id and iq are the quadrature components of the rotating vector. A vector rotation transform 124 redefines the current vector components in terms of a direct stationary axis and an orthogonal quadrature stationary axis all in phase with the transformer voltage by virtue of the synch signal input from synch signal generator 40. The output of vector rotation transform 124 represents the dc components of current, Id and Iq.

In the control loop, Id is maintained at ground potential while Iq is forced to follow $Iq_{ref}$. This is accomplished with the provision of proportional plus integral stages 126 and 128. Proportional plus integral stage 128 receives the Iq signal, representing actual current, from vector rotation transform 124 as one input, and receives the desired current signal $Iq_{ref}$ on line 84 from the supervisory processor 42, as the other input. If the actual signal deviates from the desired reference an error signal is generated such that proportional plus integral stage 128 will provide an output signal tending to reduce the error. The gain of the system, and therefore the degree of control, may be adjusted by adjusting the gain of proportional plus integral stage 128. By controlling dc components, rather than ac components, the gain may be set fairly high so that the reference is followed closely, without introducing instability and harmonic distortion.

After proportional plus integral correction, if any, the vector is converted back to three phase ac (still in digital form) by means of vector rotation transform 130, which also receives the synch signal from synch signal generator 40, and by two phase to three phase conversion 132. The output from this latter operation is provided to a pulse width modulator which, in turn, generates the desired control signals to operate the power converter transistor switching transistors as previously described.

The power converter 24 and power converter control 36, per se, are similar to those used in certain electric vehicle systems, such as described in U.S. Pat. Nos. 5,510,725; 5,517,063, and in copending application Ser. No. 08/258, 306, filed Jun. 10, 1994, and assigned to the assignee of the present invention. In the electric vehicle arrangement however, no charging of a battery from a multiphase main is used but rather three phase current is generated, monitored and supplied to a three phase induction motor in response to certain acceleration and braking inputs and a synchronization signal derived from a motor rotation monitor.

What is claimed is:

1. Apparatus for charging a battery from a multiphase power line, comprising:
   (A) an isolation transformer having a plurality of primary windings connected to said multiphase power line, and including a plurality of secondary windings;
   (B) a multiphase power converter;
   (C) converter control means for governing operation of said converter;
   (D) a plurality of current conducting lines respectively connecting said secondary windings to said converter;
   (E) synch signal generating means operable to provide an output synch signal indicative of the angle of voltage provided by said power line;
   (F) current sensor means positioned to obtain an indication of the current in said current conducting lines and provide output signals indicative thereof;
   (G) battery charger control means responsive to predetermined battery parameters for providing an indication of a desired battery charge current profile;
   (H) processor means responsive to said charge current profile for generating a corresponding reference signal; and
   (I) said converter control means being connected to receive (i) said output signals from said current sensor means, (ii) said synch signal and (iii) said reference signal, to generate and apply control signals to said converter to control said current in each said current conducting line to be substantially in phase with the voltage at the secondary to which said line is connected, and to provide a charging current in accordance with said profile.

2. Apparatus according to claim 1 wherein:
   (A) said converter is of the type which will convert ac to dc as well as dc to ac; and
   (B) said charge current profile includes at least one positive charging pulse followed by at least one negative discharging pulse.

3. Apparatus according to claim 1 wherein:
   (A) said battery is located on an electric vehicle.

4. Apparatus according to claim 2 wherein:
   (A) said battery charge control means is also located on said vehicle.

5. Apparatus according to claim 1 wherein:
   (A) said predetermined battery parameters include battery temperature, battery current and battery voltage.

6. Apparatus according to claim 1 wherein:
   (A) said multiphase power line is a three phase power line; and
   (B) said current sensor means includes at least two current sensors each positioned to obtain an indication of current in said current conducting lines.

7. Apparatus according to claim 6 wherein:
   (A) three current sensors are provided, one for each of said current conducting lines.

8. Apparatus according to claim 1 wherein:
   (A) said isolation transformer includes an additional set of secondary windings; and which includes
   (B) means connected to said additional set of secondary windings to obtain an indication of secondary voltage phase angle.

9. Apparatus according to claim 8 wherein:
   (A) said multiphase power line is a three phase power line; and which includes
   (B) means for transforming the three phase voltage of said additional set of secondary windings into an equivalent two phase signal; and
   (C) resolver means for generating said synch signal utilizing said two phase signal.

10. Apparatus according to claim 8 which includes:
    (A) voltage booster means disposed in each of said current conducting lines.

11. Apparatus according to claim 10 wherein:
    (A) said voltage booster means disposed in each of said current conducting lines is an inductor.

12. Apparatus according to claim 10 wherein:
    (A) the peak voltage of a secondary winding of said isolation transformer is less than the nominal voltage of said battery.

* * * * *